Figure 1:
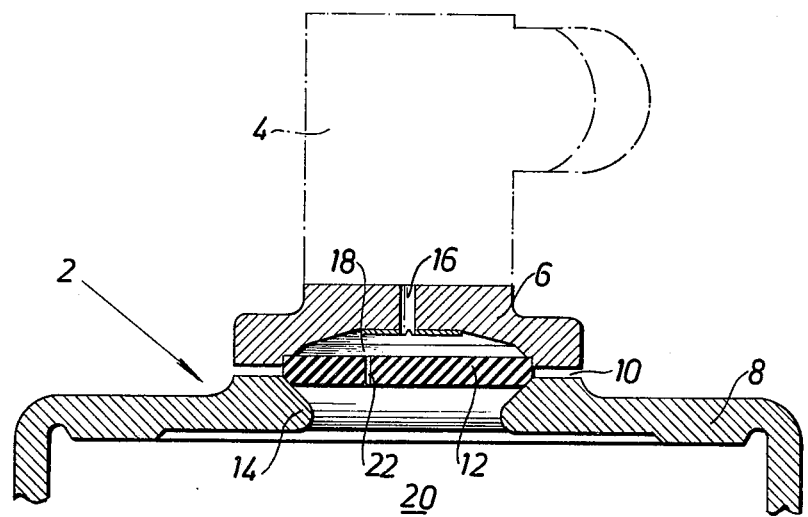

United States Patent [19]

Aurell

[11] 4,251,048
[45] Feb. 17, 1981

[54] PILOT VALVE

[75] Inventor: Sven E. F. Aurell, Växjö, Sweden

[73] Assignee: AB Svenska Fläktfabriken, Stockholm, Sweden

[21] Appl. No.: 21,062

[22] Filed: Mar. 16, 1979

[30] Foreign Application Priority Data

Mar. 17, 1978 [SE] Sweden ............................... 7803121

[51] Int. Cl.³ ..................... F16R 31/126; F16R 31/02
[52] U.S. Cl. .................................. 251/30; 251/61.1; 251/46
[58] Field of Search .................... 251/30, 45, 46, 61.1

[56] References Cited

U.S. PATENT DOCUMENTS

| 2,738,157 | 3/1956 | Vargo | 251/30 |
|---|---|---|---|
| 2,870,986 | 1/1959 | Vargo | 251/30 |
| 2,940,722 | 6/1960 | Vargo | 251/30 |
| 3,022,039 | 2/1962 | Cone et al. | 251/46 |
| 3,120,372 | 2/1964 | Gresham | 251/46 |
| 3,394,532 | 7/1968 | Oetiker | 55/302 |
| 4,033,732 | 7/1977 | Axelsson | 251/61.1 |
| 4,128,227 | 12/1978 | Blomquist | 251/42 |

FOREIGN PATENT DOCUMENTS

| 560801 | 9/1957 | Belgium . | |
| 2344773 | 3/1977 | France . | |
| 30440 | 5/1966 | German Democratic Rep. | 251/46 |
| 278097 | 1/1952 | Switzerland | 251/30 |

OTHER PUBLICATIONS

R. A. Webber-Three Way Solenoid Valves, Series 17-Granzow AB.

*Primary Examiner*—Martin P. Schwadron
*Assistant Examiner*—G. L. Walton
*Attorney, Agent, or Firm*—Dann, Dorfman, Herrell and Skillman

[57] ABSTRACT

A pilot valve is described for control of a pulse valve for e.g. production of pulses of compressed air. The pilot valve comprises a housing having an inlet and an outlet, a movable valve element disposed inside the housing, and means for switching said valve element between a closed and an open position, said inlet and outlet communicating in the open position. At least a portion of the interior of the housing presents in one plane a circular shape, the outlet being formed as a radial slot from this portion around at least a part of the periphery. The valve element is designed as a flexible disc which in the closed position is located in said plane to seal the slot with its outer edge at the inner side of the housing. Said means are arranged to switch the valve element to the open position by giving the disc a curved shape so that the outer edge no longer covers the slot.

9 Claims, 2 Drawing Figures

PILOT VALVE

The present invention relates to a pilot valve for control of a pulse valve, which pilot valve comprises a housing having an inlet and an outlet, a movable valve element disposed in said housing, and means for switching said valve element between a closed and an open position, said inlet and said outlet communicating in said open position.

A pilot valve of this type is primarily intended to be used for controlling a larger valve, e.g. a pulse valve for production of pulses of compressed air for cleaning of air filtering systems. The pilot valve is then arranged to reduce the pressure on one side of the diaphragm of the pulse valve upon activation, this diaphragm being moved by the vacuum while overcoming e.g. the force from a spring, from a position in which the valve is closed to an open position, see Swedish Pat. No. 391 458, especially figures 4 and 5.

Previously known pilot valves are essentially formed of an ordinary evacuating valve of the type having a diaphragm and means for switching the diaphragm of the valve between closed and opened positions. The purpose of the present invention is to provide a new type of pilot valve, the function of which is more effective and more reliable at the same time as its structure is more simple.

This purpose is obtained by a pilot valve of the type mentioned above which is characterized in that the housing is so designed, that at least a portion of the interior of said housing, in one plane, presents a circular shape, said outlet being formed as a radial slot from said portion along at least a part of the periphery, and in that said valve element is formed as a flexible disc which in the closed position is positioned in said plane to seal said slot with its outer edge at the inner side of said housing, said means being arranged to switch said valve element to the open position by giving said plate a curved shape so that said outer edge no more covers said slot.

By having the outlet of the valve housing in the shape of a radial slot extending around at least a part of the periphery of the housing, preferably around major parts of the periphery, the total cross section of the outlet port becomes comparatively large even for a narrow slot. Thus the valve gets improved evacuation capacity.

This feature is further improved by giving the valve an aerodynamically favourable design so that the resistance against the air flow through the valve in the open position is minimal. In the open position, namely, the valve presents a direct and very short connection between the inlet and the outlet.

Further, as the valve element is designed as a flexible disc which in the closed position seals said slot with its outer edge and which in the open position is curved so that the slot is no more covered a simple, rugged, and very reliable construction is obtained.

Figure 2:
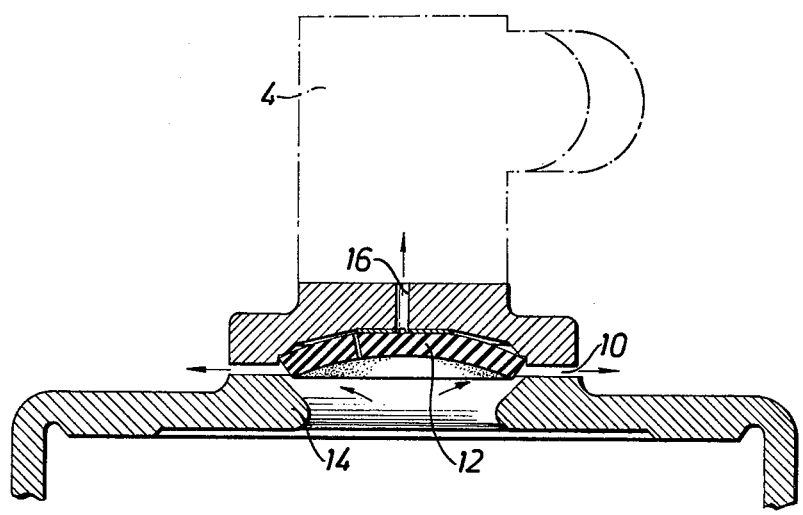

An embodiment of the pilot valve according to the invention, chosen as an example, is now going to be described in greater detail with reference to the accompanied drawing on which FIG. 1 shows a cross section of the pilot valve according to the invention in the closed position, and;

FIG. 2 a cross section of the pilot valve in the open position.

The embodiment of the pilot valve shown in the figures comprises a servo controlled evacuation valve 2, which is controlled by a small directly operating electric valve 4. As this electric valve 4 can e.g. a commercially available magnetic valve be used of type series 17 made by Webber.

The housing of the evacuation valve 2 consists of an upper part 6 and a lower part 8 with a radial slot 10 formed between these parts which slot extends essentially around the whole valve housing. This slot is forming the outlet of the valve and as the slot is extending around essentially the whole housing also a comparatively narrow slot results in a large total outlet cross section which in its turn gives the valve a very great evacuation capacity.

A circular rubber disc 12 having a size adjusted to the inner dimensions of the valve housing is disposed inside the valve housing in such a way that the disc with its outer edge seals the slot 10 in the closed position of the valve, FIG. 1. In this position the disc 12 rests on a support 14 extending around the inner side of the valve housing and delimits inside the housing a space 18 having only a very narrow connection 22 with the outlet 20 of the valve.

In the upper part 6 of the valve a port 16 is formed through which the electric valve 4 communicates with said delimited space 18 on the top side of the disc 12.

The evacuation valve 2 is opened by starting operation of the electric valve 4 so that the space 18 is evacuated. Thus, when the pressure on the top side of the disc 12 is reduced the disc 12 is deflected to a cup shape so that the disc will essentially bear on the inner side of the upper part 6, and the slot 10 is no more covered, see FIG. 2. The outlet slot 10 is then connected to the inlet of the evacuation valve 20 which in its turn can be connected e.g. to a room on one side of the diaphragm of a pulse valve, whereby the pulse valve can be controlled by pressure variatons on the diaphragm of the pulse valve caused by evacuation of said room of the pulse valve.

Through the disc 12 a hole 22 is extending through which air passes due to the different pressures prevailing on the two sides of the disc when the disc is in the position shown in FIG. 2, until an equalization of the pressure has taken place so that the disc 12 can return to its flat position shown in FIG. 1 in which the disc closes the slot 10.

I claim:

1. A pilot valve for controlling a pulse valve, which pilot valve comprises a housing having inlet and outlet, a movable valve element disposed in the housing, and means for switching said valve element between closed and opened positions, said inlet and outlet communicating in the open position, characterized in that said housing has a cylindrical interior outline so that at least a portion of the interior of the housing presents a circular seat in one plane, said outlet being shaped as a circumferential radial slot from this seat portion around at least a part of the periphery, and in that said valve element is formed as a flexible disc which in the closed position is positioned in said plane to seal said slot with the outer peripheral margin of said disc engaging said seat at the inner side of said housing, said means being arranged to switch said valve element to the open position by giving said disc a curved cup-shape out of said plane so that said outer peripheral margin is displaced from said seat whereby it no longer covers said slot.

2. The valve according to claim 1, characterized in that said housing comprises two parts joined to each other, said slot being formed between said parts, and comprising a major part of the circumference around the whole housing.

3. The valve according to claim 1 or 2, characterized in that said disc is disposed to delimit, in the closed position, a vacuum chamber inside said housing substantially isolated from said inlet.

4. The valve according to claim 3, characterized in that said means for switching said valve element comprises a device for reducing the pressure in said vacuum chamber, the vacuum giving said disc a curved cup-shape.

5. The valve according to claim 4, wherein said housing has an essentially cup-shaped portion on the inner side defining with said disc said vacuum chamber, and wherein further said disc in the open position abuts against said cup-shaped portion.

6. The valve according to claim 4, characterized in that said device for reducing the pressure in said vacuum chamber comprises an electric valve which is connected to said chamber through a port in said valve housing.

7. The valve according to claim 1, characterized in that said disc consists of rubber.

8. The valve according to claim 1, characterized in that said circular seat is positioned adjacent the interior wall of said housing which has the largest radius.

9. The valve according to claim 1, characterized in that said seat comprises a support formed around the inner side of the valve housing.

* * * * *